United States Patent Office 3,206,539
Patented Sept. 14, 1965

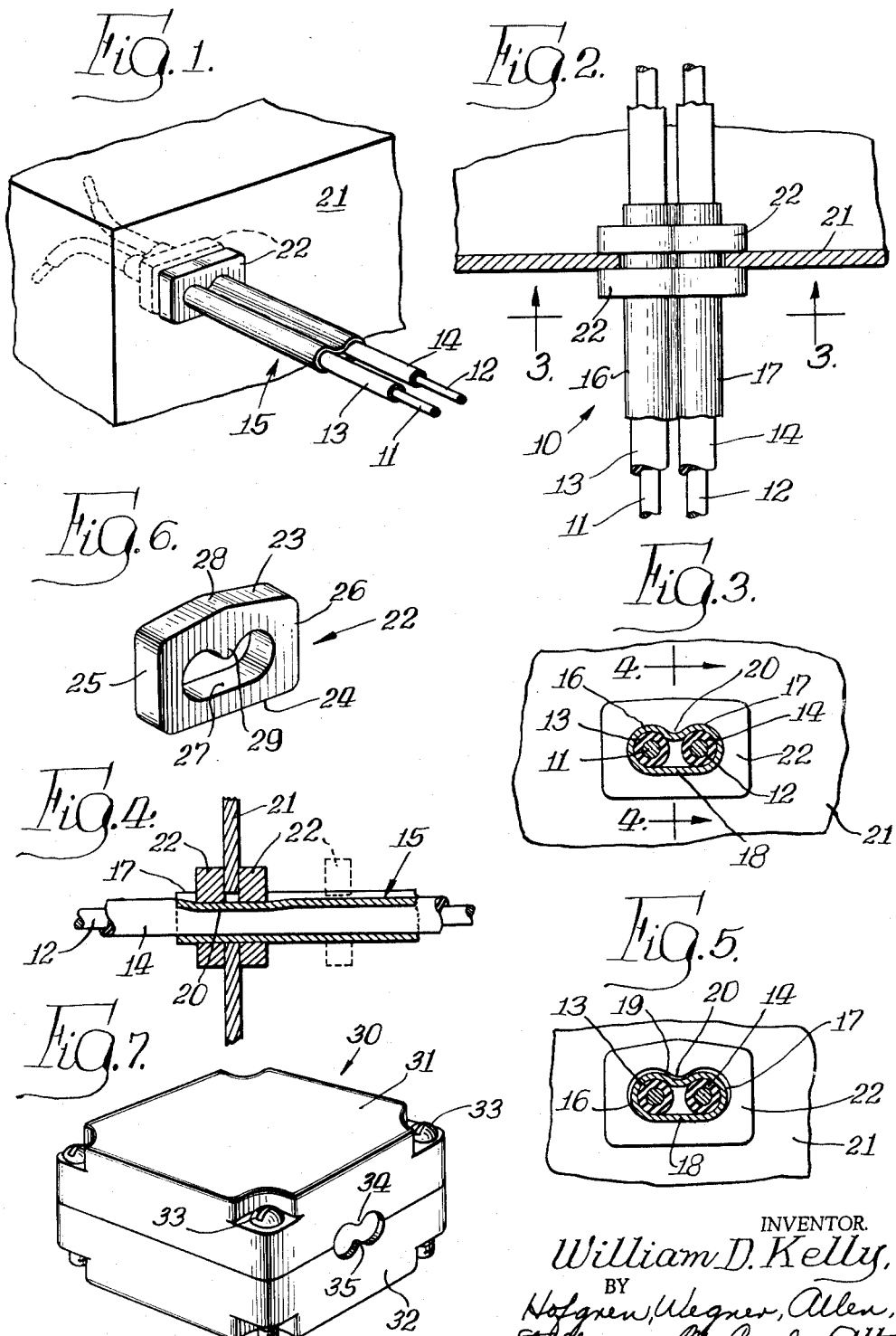

3,206,539
METAL SHEATHED ELECTRICAL CONDUCTORS
William D. Kelly, 12 Blodgett St., Clarendon Hills, Ill.
Filed May 3, 1963, Ser. No. 277,789
2 Claims. (Cl. 174—68)

This invention relates to a conduit and more particularly to an electrical conduit of new and improved construction.

It is the general object of the present invention to produce a new and improved electrical conduit.

It is a more specific object of the present invention to produce an electrical conduit of simple construction which is readily and easily installed and which will perform in a manner superior to the forms of electrical conduits presently in general use.

As is well known in the electrical arts, electrical wiring is normally passed through metal conduits in order to protect the wires from damage, to provide an enclosure for the wires in the event of a short circuit, and inasmuch as the metal conduits are normally connected to ground, to provide a shunt for electrical current in the event the insulation normally covering the wires is broken and the wire comes into contact with the conduit. Such metal conduits normally take two forms, the first being commonly known, as a "thin wall conduit" which is in the form of a metal pipe which may be bent by the application of suitable tools and fastened in place as the conduit for electrical wires. After installation of the conduit, the wires are then "fished" through the conduit for the purpose of carrying electrical current from a source to suitable sites for use. As indicated, thin wall conduits normally cannot be bent properly except by the use of tools and some degree of skill is necessary in performing the bending operation. Additionally, after installation of the conduits the wires must be "fished" through, a task which is often difficult particularly when a number of wires must be so drawn through the entire length of the conduit.

A second form of normally used conduit is the so-called "BX" conduit which is a flexible metal sheath normally with a pair of electrical wires preinstalled therein. "BX" is unsightly, is incapable of supporting itself, and where a number of wires must be run from one position to another, a separate "BX" cable is often needed for each pair of wires.

A further difficulty present with both the thin wall and "BX" conduits is the fact that the construction is such as to normally entrap a good deal of air within the conduit. Thus, the wires are enclosed in a fire-supporting atmosphere, a situation which, while dangerous, has heretofore been impossible to avoid.

According to the present invention, however, there is provided a conduit wherein the wires are encased in a metal sheath and hence protected against damage, and yet the assembly is one which can readily be bent by hand, which eliminates the necessity for fishing wires therethrough, is one wherein the wires while protected are surrounded by metal rather than air and hence are not maintained in an atmosphere which will support fire, and all of these attributes may be assembled in an embodiment which presents a neat, trim and pleasant appearance.

Additionally, the invention includes a clamp or locking device for locking the terminal ends of the conduit of this invention to a junction box or similar device in order to provide means for maintaining the conduit in position. The conduit of the present invention possesses the ability to support itself to a great extent and may be installed easily with a minimum amount of labor and requisite skills, and without the need of special tools.

Other and further objects and advantages of the present invention will be readily apparent from the following description and drawings, in which:

FIGURE 1 is an elevational view of the conduit and clamp of this invention;

FIGURE 2 is a sectional view, somewhat enlarged, showing the conduit and clamp illustrated in FIGURE 1;

FIGURE 3 is a sectional view along the line 3—3 of FIGURE 1;

FIGURE 4 is a sectional view along the line 4—4 of FIGURE 3;

FIGURE 5 is a view like FIGURE 3 showing the clamp of the invention before the same is deformed to exert its clamping action;

FIGURE 6 is an elevational view of the clamp usable with the conduit shown in the drawings; and FIGURE 7 is a side elevational view showing a modified form of junction box usable with the conduit comprising the invention.

While this invention is susceptible of embodiment in many different forms, there is shown in the drawings and will herein be described in detail a specific embodiment and a modification thereof, with the understanding that the present disclosure is to be considered as an exemplification of the principles of the invention and is not intended to limit the invention to the embodiment illustrated. The scope of the invention will be pointed out in the appended claims.

Referring now to the drawings, the conduit 10 of the present invention includes a pair of electrical current conducting wires 11 and 12 encased in suitable insulation 13 and 14, which is preferably of the plastic type. Surrounding and encasing the insulated wire is a metal sheath 15 preferably of aluminum having a thickness of the order of 0.020 inch. The sheath is formed so as to have a pair of first portions 16 and 17 substantially surrounding and frictionally gripping the insulation 13 and 14 with the sheath being formed so as to provide a first web 18 extending linearly between the first portions of the sheath, together with a second web portion 19 on the other side of the wires and provided with a longitudinally extending indentation 20.

The conduit assembly so far described may be readily and easily manufactured, and inasmuch as the sheath fits tightly around substantially the entire surface of the wire, there is a minimum amount of fire-supporting atmosphere in contact with the wires. The assembly is neat in appearance, small in size, and can be readily bent around corners, etc.

In normal practice where it is desired to connect the wires to other electrical wires for the purpose of supplying electrical current, a junction box is used such as the box 21. In the preferred form this is a metal box which may be provided with a suitable opening through which the sheath 15 may be inserted so that the wires may be bared as shown in dotted lines in FIGURE 1. For the purpose of securing the electrical conduit in position relative to the box and for establishing an electrical contact between the sheath and the box (the sheath being grounded at some suitable point), clamps 22 are provided, the clamps being of deformable metal such as aluminum, and having a top 23, a bottom 24, sides 25 and 26, and an opening 27 therethrough, with the opening having approximately the same shape as the cross-sectional shape of the conduit. Prior to inserting the ends of the wires into the box 21, the conduit is inserted through the opening 27 and while but a single clamp 22 may be used, it is preferable to use two clamps 22, one inside and one outside the box as shown in FIGURES 1 and 2. After the conduit is inserted into the clamp as shown in FIGURE 5, pressure is exerted between the top 23 and the bottom 24 of the clamp, such as with the jaws of a pair of pliers with the jaws resting on a raised portion 28 on the top 23. The existence of the raised portion causes a concentration of the deforming force over the conduit so as to force a projection 29 into the indentation 20. As a result, and by the use of the simple tools described, a very powerful clamping force is exerted on the conduit holding the same in secure position, particularly where two clamps are utilized in the manner shown.

In the modified form illustrated in FIGURE 7 there is provided a metal box 30 having a top 31 mating with a bottom 32 with the top and bottom being held together by means of the screw device 33. At the corresponding edges of the top and bottom there may be provided contoured openings 34 and 35, respectively, to provide an opening having the same general cross-sectional shape as that of the sheath 15. The sheath 15 may be inserted through the opening formed at 34–35 so that the ends positioned within the box may be bared. As the screws 33 are tightened to secure the top portion 31 and the bottom portion 32, the sheath 15 is deformed by the edges of the contoured openings 34 and 35 in much the same manner as the pliers deform the clamp 22 in the preferred form of the invention to secure the conduit in position.

As will be readily apparent to those skilled in the art, the structure provided by the present invention lends itself to many useful purposes in the field of electrical wiring and provides an efficient, novel and neat appearing electrical conduit having all of the advantages hereinbefore noted.

I claim:

1. An electrical conduit comprising a pair of electrically insulated wires, a thin imperforate metal sheath having a pair of first portions substantially surrounding and frictionally engaging said wires to clamp the same within said first portions, said sheath having an intermediate web portion spacing apart said first portions, said sheath holding said wires in spaced parallel relationship thereby forming a unitary structure of the sheath and the wires enclosed therein, which structure may be bent around obstructions and cut to desired length.

2. An electrical assembly comprising an electrical conduit having a pair of electrically insulated wires, a thin metal sheath having a pair of first portions substantially surrounding and frictionally engaging said wires, said sheath having a first web portion extending generally linearly between said first portions on one side of the conduit and a second web portion extending between said first portions on the other side of the conduit, said second web portion having a continuous indentation extending longitudinally of the conduit, both of said web portions being secured to said first portions to hold said wires in spaced parallel relationship and a clamp comprising a block of deformable metal, said block having an opening therethrough conforming generally to the cross section of said conduit, said conduit being disposed through said opening, one side of said of said block having a raised portion positioned generally centrally over the opening and to which raised portion pressure may be applied, said block being deformed into frictional engagement with said conduit.

References Cited by the Examiner
UNITED STATES PATENTS

| | | | |
|---|---|---|---|
| 1,132,355 | 3/15 | Kistier | 174—72 |
| 1,760,663 | 5/30 | Rosenfield. | |
| 1,810,958 | 6/31 | Fullman | 174—65 |
| 2,139,888 | 12/38 | Fausek et al. | |
| 2,365,785 | 12/44 | Tinnerman | 174—153 X |
| 2,697,157 | 12/54 | Kersta | 174—72 X |
| 2,872,504 | 2/59 | Woodring | 174—65 |
| 2,894,056 | 7/59 | Bogese | 174—92 |
| 2,994,734 | 8/61 | Scofield et al. | 174—5 X |
| 3,029,405 | 4/62 | Buchanan | 174—51 X |
| 3,049,582 | 8/62 | Shinn | 174—92 |

OTHER REFERENCES

Jungnitsch, German application Ser. No. 8,094, printed December 1956.

JOHN F. BURNS, *Primary Examiner.*

DARRELL L. CLAY, *Examiner.*